Dec. 18, 1962 A. J. KIZAUR ETAL 3,069,544
SERIALOGRAPHIC OR SPOT FILM APPARATUS
Original Filed April 25, 1957 10 Sheets-Sheet 1
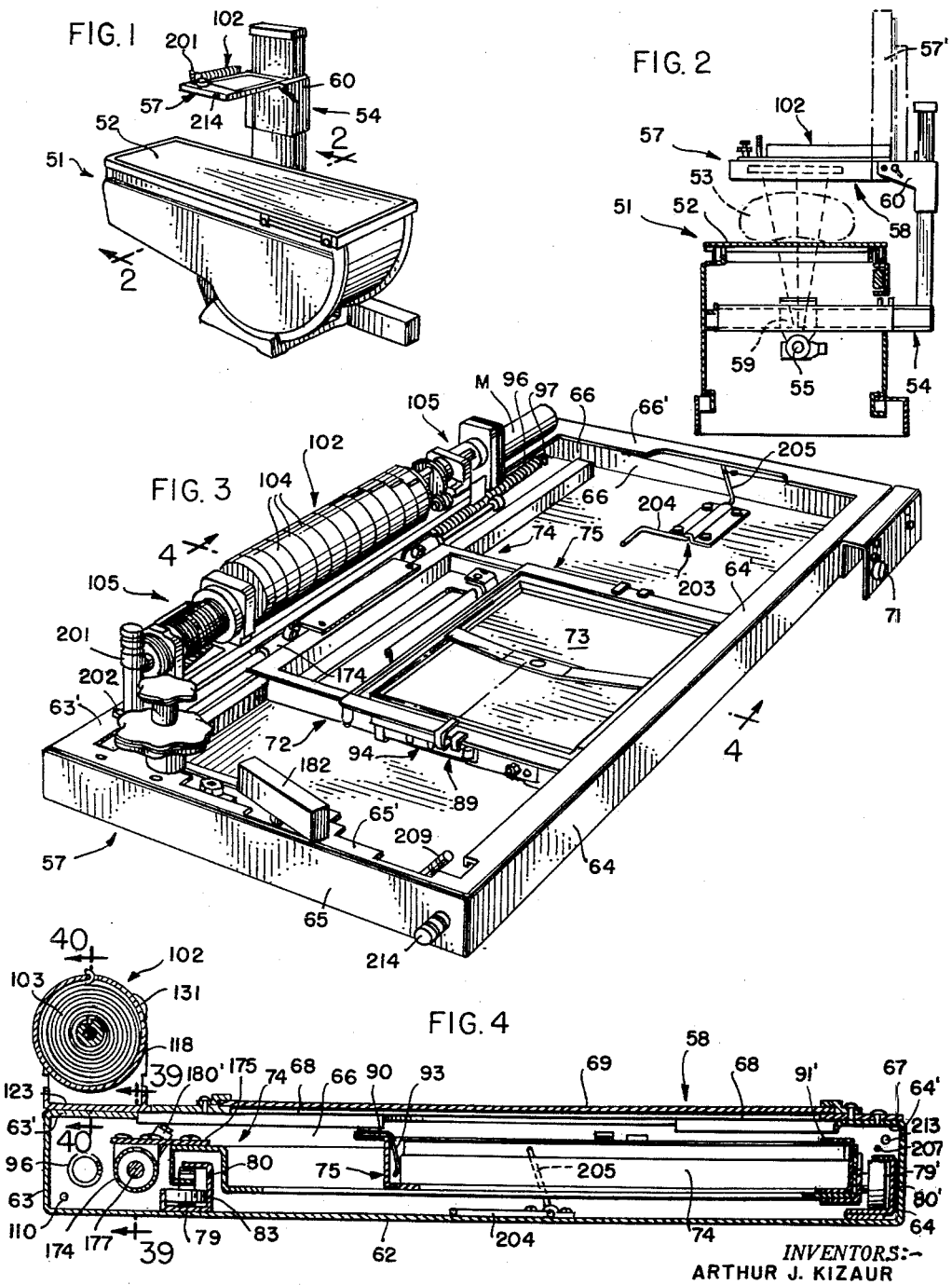
INVENTORS:-
ARTHUR J. KIZAUR
ROBERT J. MUELLER
MITCHELL SKROBISH
BY:- Junius F. Cook, Jr.
ATTORNEY

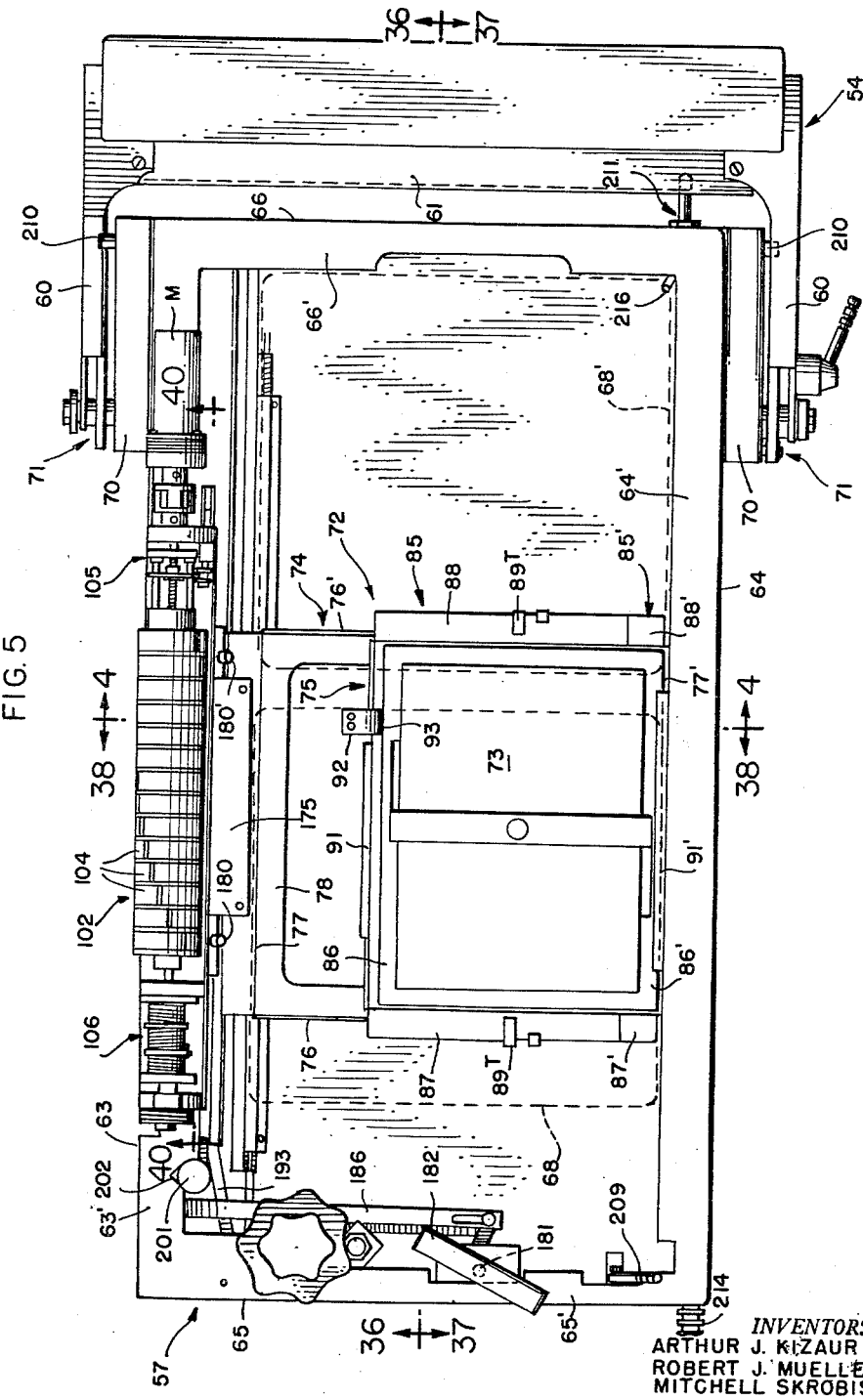

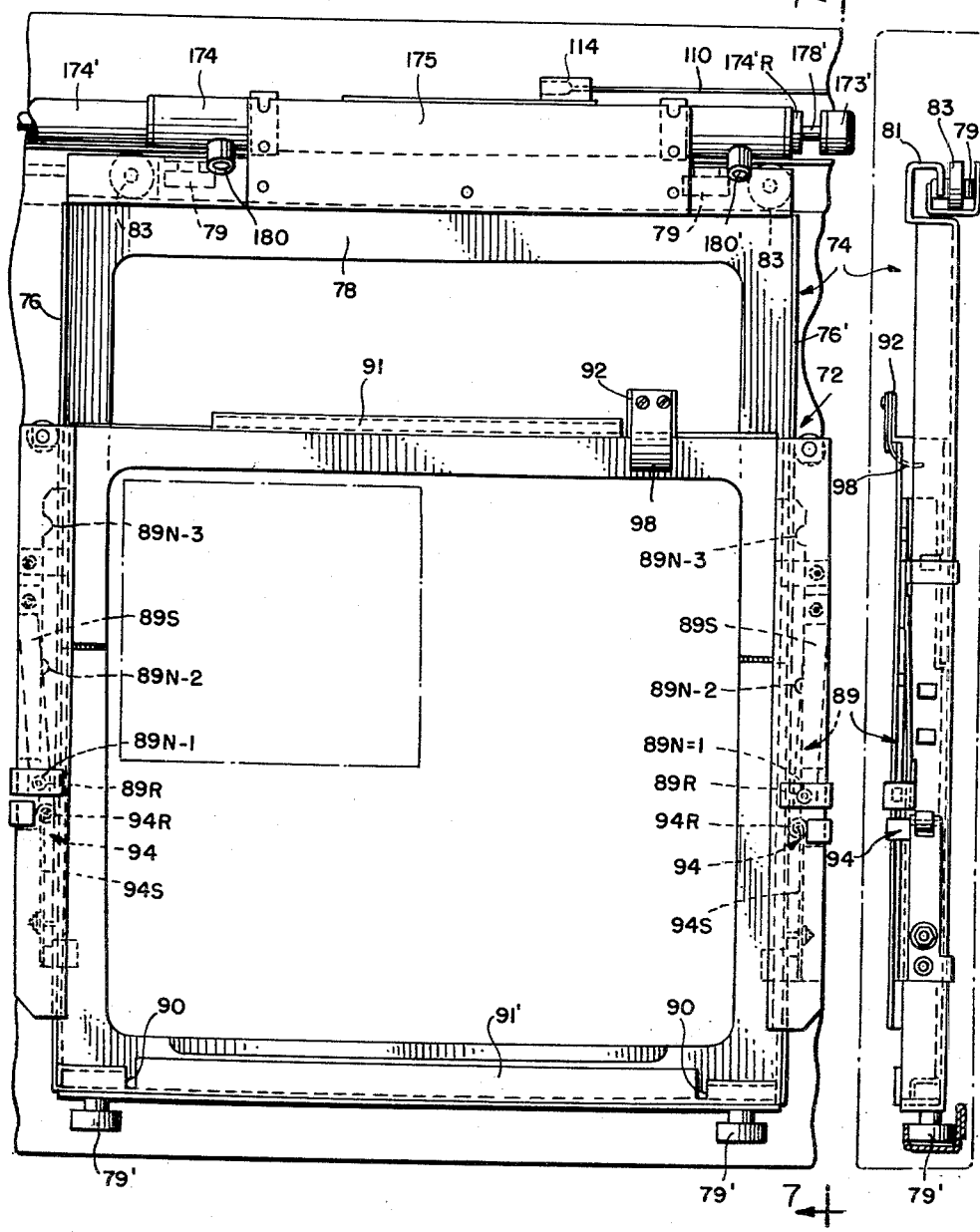

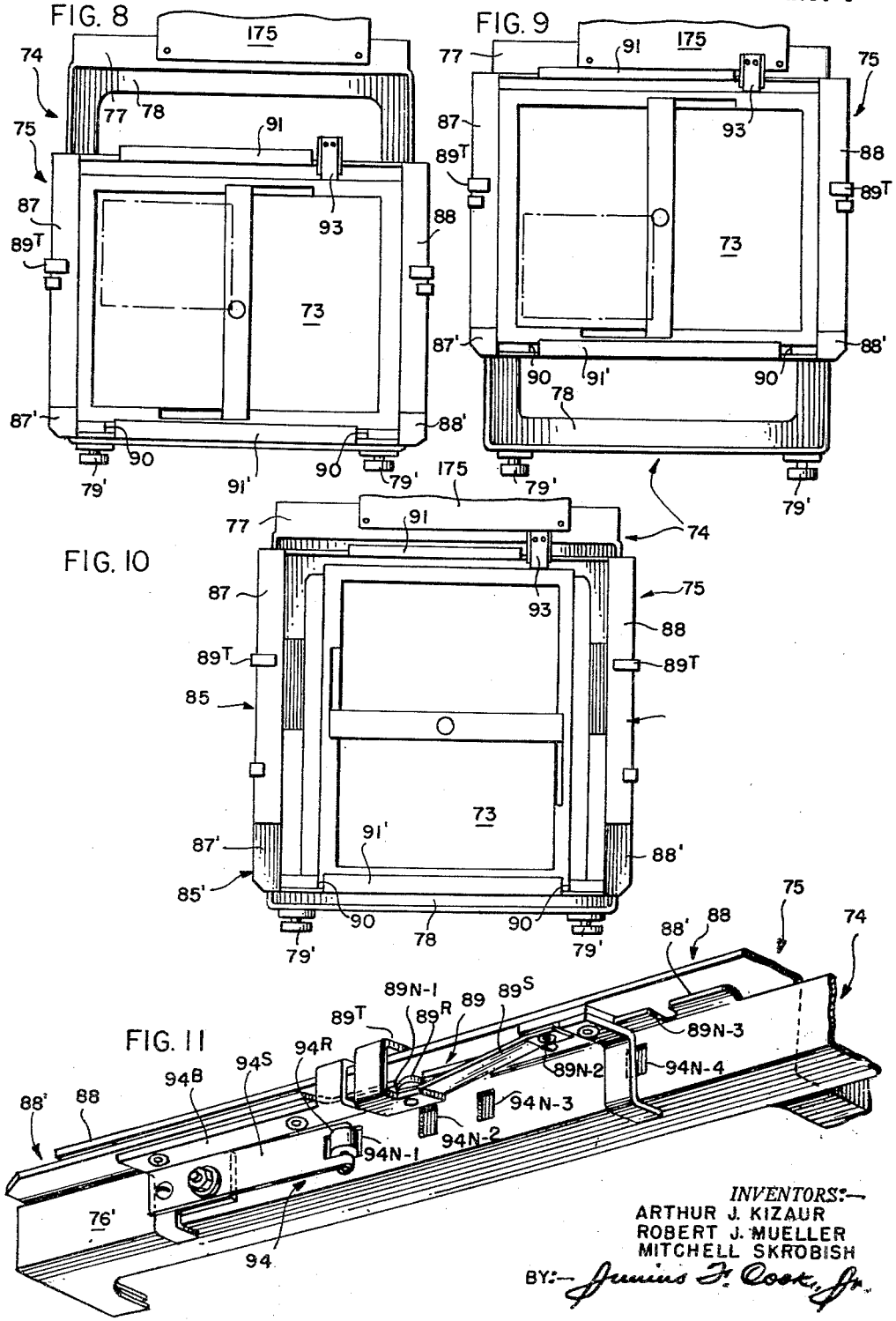

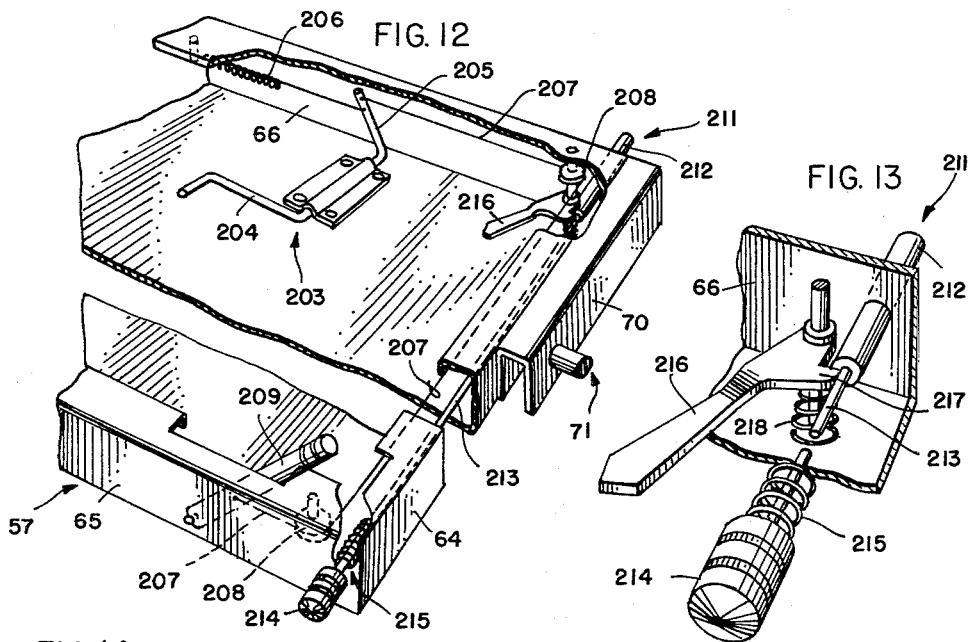

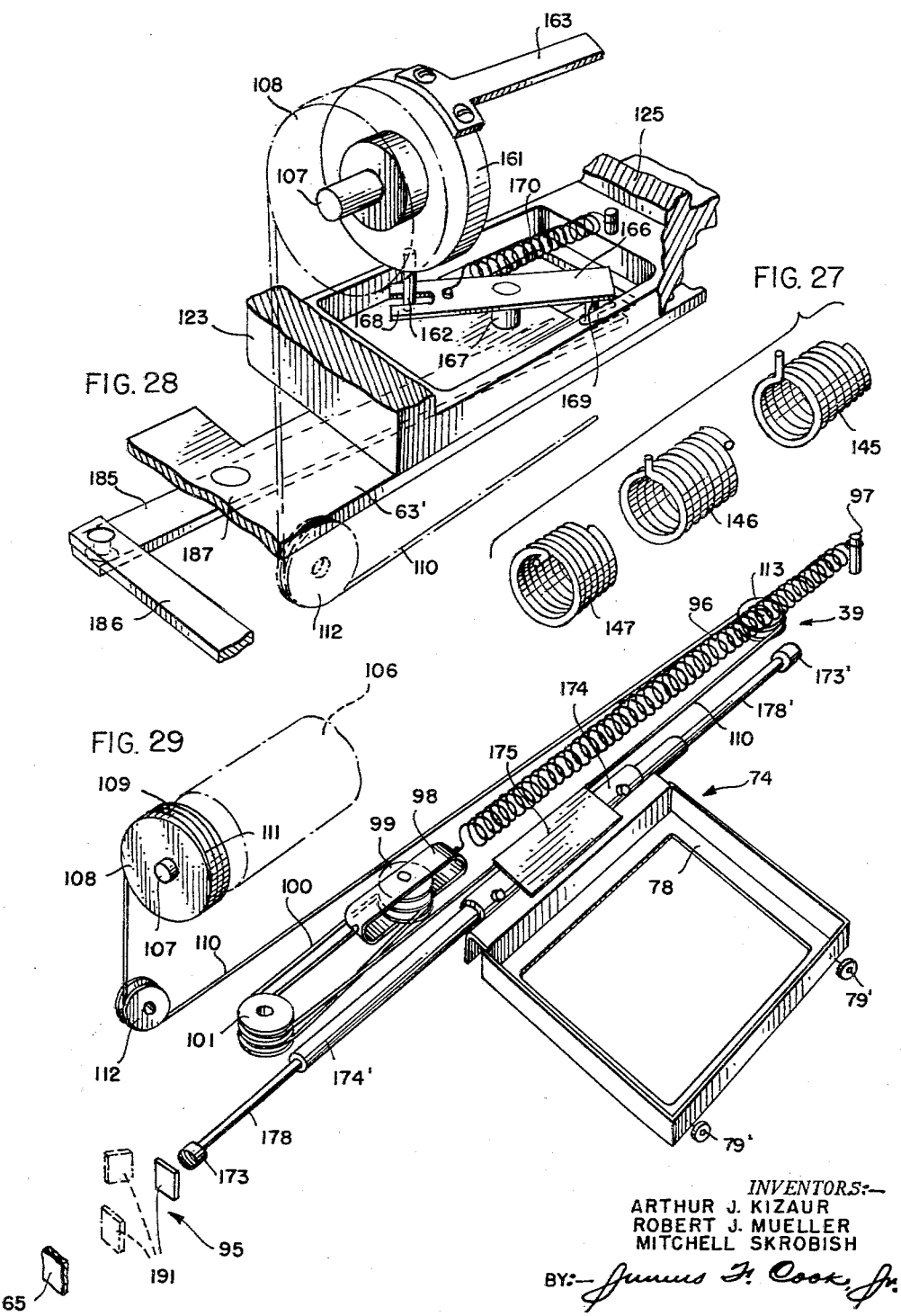

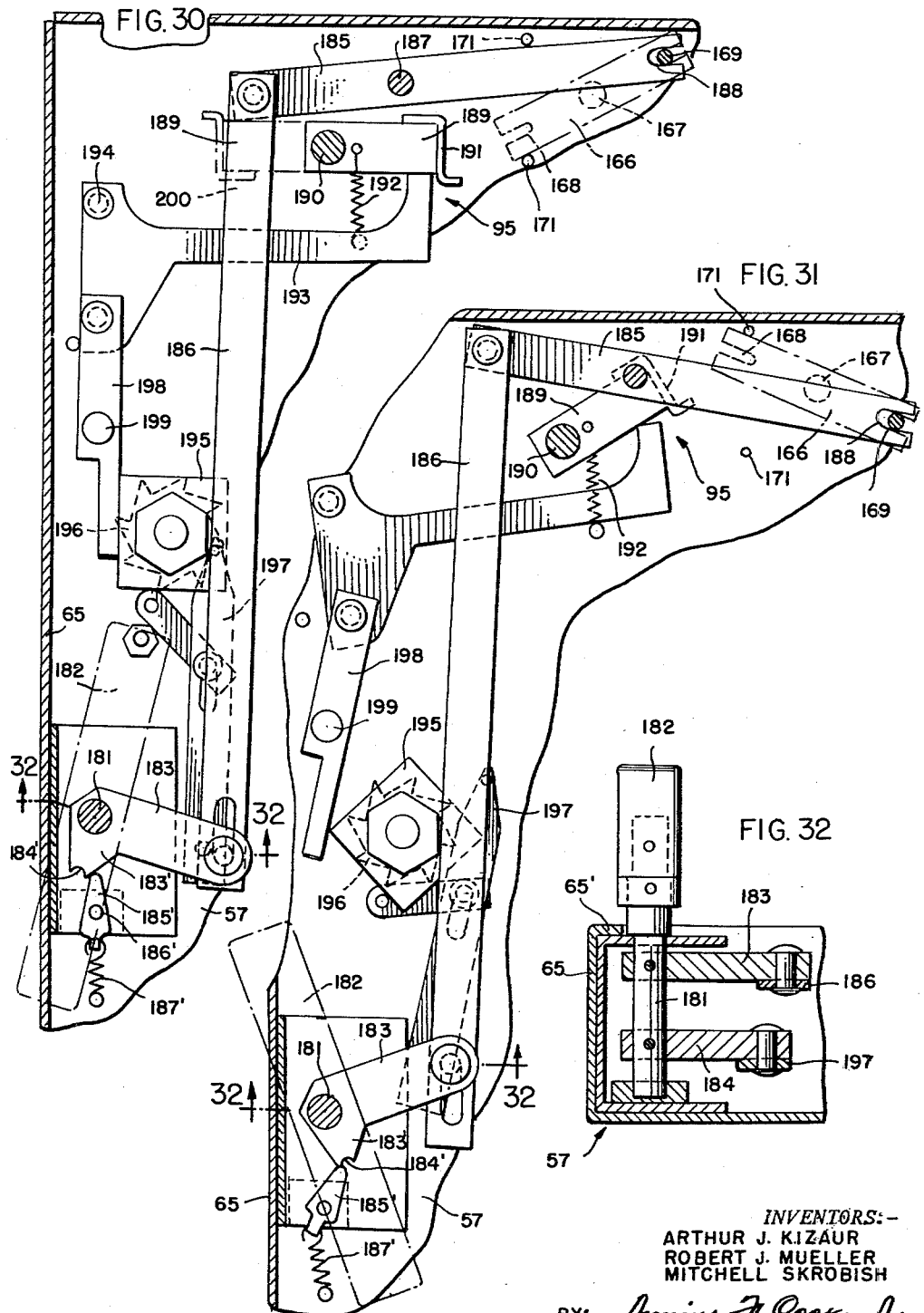

Dec. 18, 1962     A. J. KIZAUR ETAL     3,069,544
SERIALOGRAPHIC OR SPOT FILM APPARATUS
Original Filed April 25, 1957     10 Sheets-Sheet 8

INVENTORS:—
ARTHUR J. KIZAUR
ROBERT J. MUELLER
MITCHELL SKROBISH

BY:— *Junius F. Cook, Jr.*
ATTORNEY

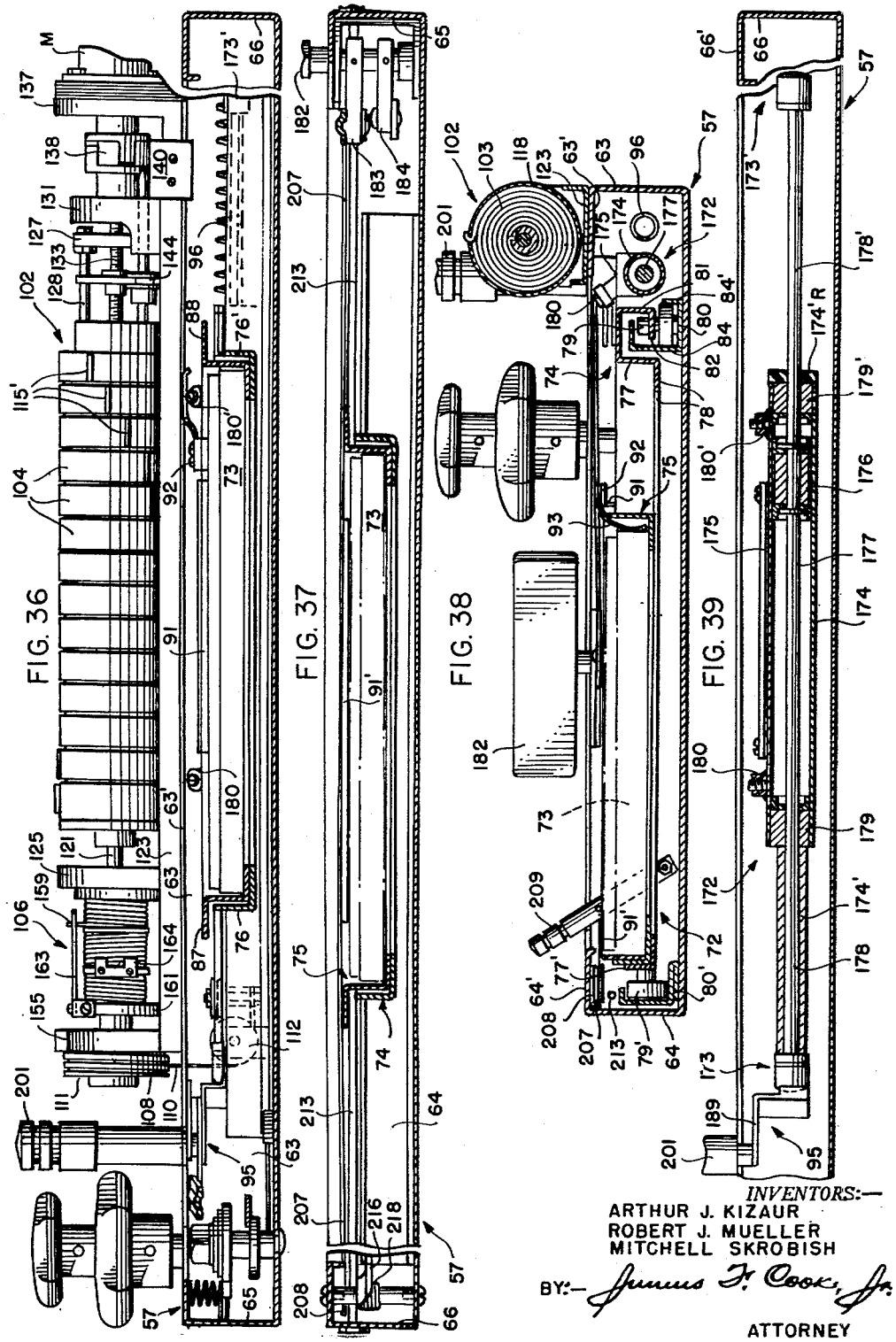

Dec. 18, 1962   A. J. KIZAUR ETAL   3,069,544
SERIALOGRAPHIC OR SPOT FILM APPARATUS
Original Filed April 25, 1957   10 Sheets—Sheet 10
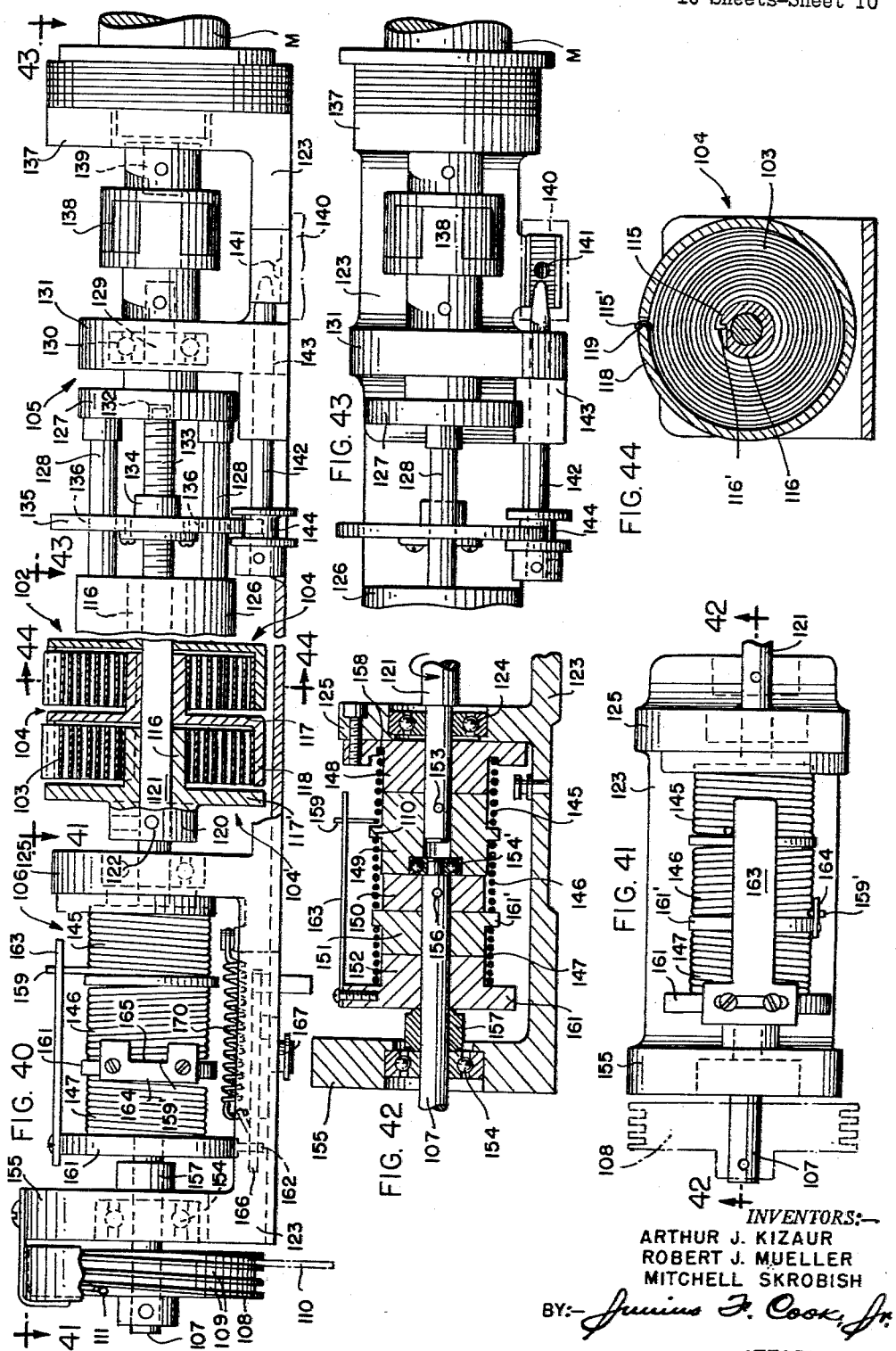
INVENTORS:—
ARTHUR J. KIZAUR
ROBERT J. MUELLER
MITCHELL SKROBISH
BY:— Junius F. Cook, Jr.
ATTORNEY

United States Patent Office 3,069,544
Patented Dec. 18, 1962

3,069,544
SERIALOGRAPHIC OR SPOT FILM APPARATUS
Arthur J. Kizaur, Brookfield, and Robert J. Mueller and Mitchell Skrobish, Milwaukee, Wis., assignors to General Electric Company, a corporation of New York
Continuation of abandoned application Ser. No. 655,113, Apr. 25, 1957. This application Feb. 1, 1960, Ser. No. 6,341
13 Claims. (Cl. 250—56)

This application is a continuation of our application, Serial No. 655,113 filed April 25, 1957 and entitled "Serialographic or Spot Film Apparatus," now abandoned.

The present invention relates in general to X-ray apparatus, and has more particular reference to serialographic or spot film mechanism for supporting and shifting ray sensitive sheets or plates used in producing shadow pictures in X-ray photography and fluoroscopy, in the manner shown in U.S. Letters Patent Nos. 2,327,603 and 2,552,858.

An important object of the invention is to provide improved apparatus of the character mentioned for supporting and shifting picturing material, such as X-ray film, in position for ray exposure, above a suitable support table, in the making of photographs, said apparatus embodying relatively inexpensive spring actuated means for shifting the supported picturing material between projected picturing and retracted positions in a suitable support structure; a still further object being to provide improved spring means operable not only to project the supported picturing material from retracted toward projected picturing position, but also to return the material from projected to retracted position; yet another object being to provide motor driven means for tensioning a driving spring for the performance of its material shifting function.

Another important object is to provide driving spring means connected to normally urge carriage supported picturing material in one direction in a support structure, as from a retracted loading position toward a projected picturing position, and separate spring means operable to shift the carriage mounted picturing material in the opposite direction, to return the same to retracted position, against the contrary urge of said driving spring means, including selectively operable latches and stops for controlling the movement of carriage mounted picturing material under the influence of said driving spring means and said separate spring means.

Another important object is to provide improved driving spring means embodying a series of separate components connected in tandem, a component at one end of the series being drivingly connected with a spring tensioning motor, the component at the opposite end of the series being drivingly connectible with a load, such as the ray sensitive material support carriage, preferably under the control of selectively operable clutch means.

Another important object is to provide driving spring means comprising a series of separate spiral spring components and interconnecting wheels, each having a hub portion, adapted for driving connection with the inner end of a spiral spring component, and a relatively offset rim portion formed for driving connection with the outer end of an adjacent spiral component, whereby all of the springs may be tensioned by relatively turning the outer end of the spring component at one end of the series with respect to the inner end of the component at the opposite end of the series, such arrangement affording an exceedingly compact driving spring assembly providing for the storage of large amounts of driving energy in a spring assembly of relatively short length.

Another important object is to provide improved clutch means for selectively connecting yieldable driving means, such as a spring, with a spring load, such as a sensitive material carriage of the sort herein contemplated; a further object being to provide coupling means selectively operable to disconnect a driving spring or like resilient power means from a load object and to provide an anchorage for same to permit it to be tensioned while disconnected from its load, said coupling means being operable to release the power means from anchored condition, and simultaneously to drivingly connect the same with a load.

Another important object is to provide an improved coupling for interconnecting a driving and a driven shaft, said coupling embodying a helical coupling spring carried on a pair of hubs respectively connected with the shafts to be coupled, said helical spring being wound in a direction to normally tighten itself upon the hubs in response to turning movement of the driving shaft; a further object being to provide means operable to expand the coupling spring on said hubs in order to drivingly disconnect the coupled shafts; a still further object being to provide a pair of hubs turnably supported on the driven shaft, one way or over-running clutch means drivingly interconnecting said hubs, means connecting one of the hubs with an end of the coupling spring, whereby the hubs may turn freely with the driven shaft as the same is turned by the driving shaft through said coupling spring, and means to turn the other of said hubs with respect to the driven shaft to thereby turn the spring connected hub through said over-running clutch in a direction to release the coupling spring from its driving connection with the driving shaft; a further object being to form said over-running clutch as a helical snubbing spring anchored at one end on the movable hub, and having snubbing engagement with the other hub.

Another important object is to provide improved means for anchoring a spring driven shaft against turning movement, as while its driving spring is being wound up or tensioned; a further object being to employ a helical snubbing spring normally operable to contract upon a pair of hubs, including a stationary hub or bushing, carrying a spring driven shaft and an adjacent shaft connected hub, including means operable to expand the snubbing spring in order to release the spring from its anchorage for load driving purposes.

Another important object is to provide improved spring tensioning means embodying a preferably electric motor connected to wind up or tension a driving spring, a switch for controlling the operation of the motor, and a movable switch actuating member driven in one direction by the motor in tensioning the spring, and in the opposite direction by the driving action of the spring; a further object being to provide a spring driven shaft carrying a nut threaded thereon, and means drivingly connecting the nut with the spring tensioning motor, whereby the nut will travel in one axial direction on the shaft in response to spring tensioning actuation of the motor, and in the opposite direction thereon when the shaft is driven by the spring, and means actuated by the nut for operating the motor controlling switch.

Another important object is to provide improved adjustably expansible carriage means for supporting rectangular sensitive material enclosing cassettes of greater length than width for projecting and retracting movement in a support structure, whereby a cassette may be supported in the carriage with its long dimension extending either in the direction of or transversely of the projecting and retracting movement of the carriage means.

Another important object is to provide inexpensive means operable to release a sensitive material cassette from mounted position in a shiftable cassette carriage, when the carriage is in retracted or standby position in a support frame; a further object being to provide a piece of bent wire forming a bellcrank lever pivoted on the support frame, the lever having a cassette releasing arm normally urged, as by means of a spring, to an inactive or standby position beneath the cassette carriage when the same is in its retracted position in the frame, said lever having another arm connected, as by means of a cable, with a manually operable release knob conveniently located on the support frame and manually operable to shift the lever, against the influence of its biasing spring, and thereby apply its cassette releasing arm against the back of a cassette in the carriage to move the same upwardly and thus release the cassette from seated engagement in the carriage.

Another important object is to provide an improved fluid pressure buffer for arresting carriage movement in retracted and projected positions in the support frame in which mounted; a further object being to provide pneumatic stop buffer means on a cassette carriage, such buffer means embodying a carriage mounted cylinder with a longitudinally movable piston therein and connected with buffer carrying stems projecting, in opposite directions from the piston and outwardly through the opposite ends of the cylinder, in position respectively to engage cooperating retraction and projection stops on the main frame, the projection stop engaging buffer stem being appreciably longer than the retraction buffer stem, in order to accommodate several longitudinally spaced and selectively operable projection stops.

Another important object is to provide an improved selectively operable stop mechanism for determining the relatively projected position of cassette carriage means, said selectively operable stop means being operatively associated with manually adjustable means for controlling the clutch coupling of the carriage driving spring mechanism, so that the carriage may be projected and retracted in any desired one of several cassette shifting cycles.

Another important object resides in mounting a serialographic or spot film device of the character mentioned for tilting movement about a horizontal axis, whereby the frame may be disposed either in horizontal picture making position above an X-ray table structure, or, when not in use, may be arranged in vertical, parked position, as above an edge of the table, thereby leaving the space immediately above the table substantially free of obstruction, so that the table may be put to any desired use; a further object being to provide suitable pivot and latching means on the frame of the spot film device, as at the rear or pivotally supported end thereof, and manually operable latch releasing means disposed in convenient position for operation, as at the front or pivot remote end of the support frame.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

FIG. 1 is a perspective view of apparatus embodying the present invention;

FIG. 3 is an enlarged perspective view of a portion of the apparatus shown in FIG. 1;

FIG. 5 is a top plan view of the apparatus shown in FIG. 3;

FIG. 6 is an enlarged view of a portion of the structure shown in FIG.5;

Figure 33:
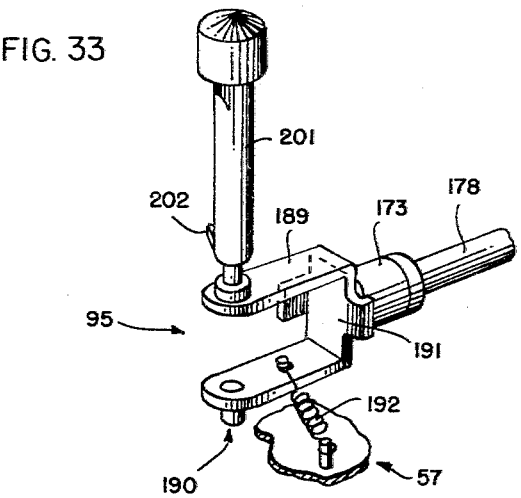
Figure 34:
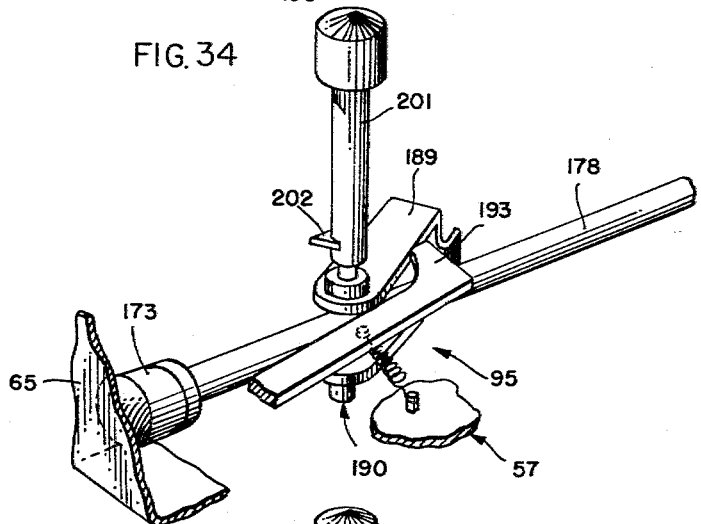
Figure 35:
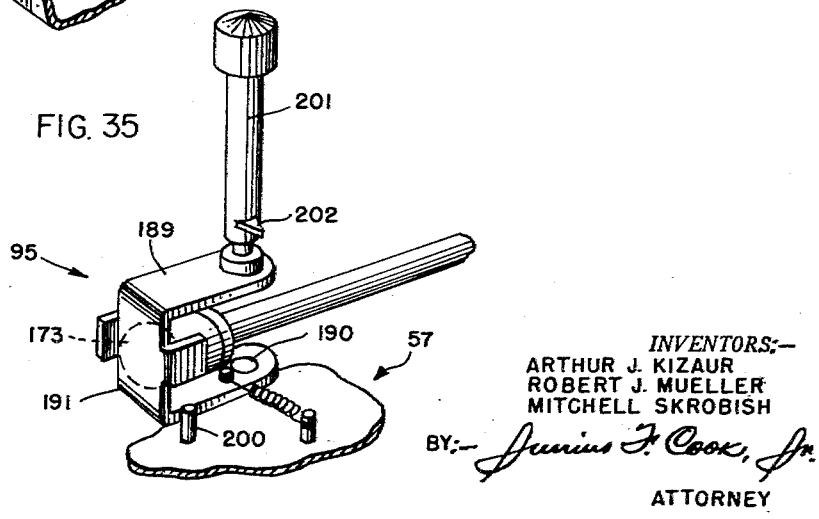

FIGS. 2, 4 and 7 are sectional views respectively taken substantially along the line 2—2 in FIG. 1, the line 4—4 in FIG. 3 and the line 7—7 in FIG. 6;

FIGS. 8, 9 and 10 show several relatively adjusted positions of the equipment illustrated in FIG. 6;

FIG. 11 is a perspective view of a portion of the structure shown in FIGS. 6–10 inclusive;

FIG. 12 illustrates improved cassette release and frame latching means;

FIG. 13 shows a portion of the structure illustrated in FIG. 12;

FIGS. 14–26 inclusive, are diagrammatic views illustrating serialographic operation of the spot film device;

FIG. 27 is a perspective view of selectively operable clutch components comprising helical snubbing springs;

FIG. 28 is a perspective view of a portion of a cassette carriage shifting mechanism;

FIG. 29 is a perspective view of a shiftable cassette carriage and improved means for shifting and stopping the same, in accordance with the present invention;

FIGS. 30 and 31 show manually operable mechanism for controlling selectively operable cassette carriage stops, as well as the clutch means for connecting the driving spring with the cassette carriage;

FIGS. 33, 34 and 35 show relatively shifted positions of selectively operable cassette carriage projection stop mechanism; and FIGS. 32, and 36–44 inclusive, are sectional views respectively taken substantially along the line 32—32 in FIGS. 30 and 31; the lines 36—36, 37—37 and 38—38 in FIG. 5; the line 39—39 in FIGS. 4 and 29; line 40—40 in FIG. 5; the line 41—41 in FIG. 40; the line 42—42 in FIG. 41; and the lines 43—43 and 44—44 in FIG. 40.

To illustrate the invention, the drawings (FIGS. 1 and 2) show a table structure 51 providing a top panel 52 for supporting an object or body 53 in position to be pictured or examined by penetrating rays, such as X-rays, and carriage means 54 for supporting a penetrating ray source 55 on one side of the panel 52, the carriage means 54 serving also to support a frame 57 carrying ray sensitive picturing means 58 on the side of the panel 52 remote from the source 55. As a consequence, a beam of penetrating rays 56, transmitted from the ray source through an adjustable shutter box 59 may be provided on the carriage means for controlling the sectional size and shape of the beam 56, and may be delivered through the panel 52 and the examination object 53 supported thereon, and applied to excite the sensitive picturing means 58 for the production of shadow pictures therein.

To support the frame 57 in position presenting the picturing means 58 in alinement with rays emitted from the source 55, the carriage means 54 may include portions extending above and at one side of the panel 52, and provide a pair of horizontally spaced apart arms 60 and a frame member 61 interconnecting said arms for carrying the frame.

The support frame 57 (FIGS. 3, 4 and 5) may comprise a preferably sheet metal housing of generally elongated, rectangular and relatively shallow box-like configuration embodying a bottom wall 62, opposed side walls 63 and 64, front and rear end walls 65 and 66, and inturned marginal flanges 63', 64', 65' and 66', formed at the upper edges of said opposite side and end walls. The open top of the frame 57 may be closed by a cover plate 67 detachably secured at its edges on said inturned flanges and formed with an opening 68 in its front end, rearwardly of and adjacent to the wall 65, in position forming a picturing station at said opening. The opening 68 may be closed by a panel or layer 69 (FIG. 4) of fluorescent material adapted to become visibly luminous in response to X-ray excitation, to thereby provide a visible shadow picture of the object being examined. Rearwardly of the opening 68, the cover plate may be formed with an additional opening 68' extending between the opening 68 and the rear wall 66 of the frame, said additional opening affording access therethrough to the interior of the box-like frame 57.

A pair of bracket forming channels 70 (FIG. 5) may be secured, as by welding the same, to the side walls 64 of the frame, said brackets providing support for pivot studs 71 for tiltably mounting the frame 57 upon the spaced arms 60 of the support structure 54. The frame 57, accordingly, may be disposed in horizontal position extending above the table top panel 52, as shown in FIGS. 1 and 2, in position presenting the picturing zone, defined by the opening 68, in alinement with the X-ray beam 56. Alternately, the frame 57 may be swung about the axis of the studs 71 to a vertical position with respect to the top panel 52, as indicated in dotted lines at 57′ in FIG. 2. When in such position, the space above the table top panel will be entirely unobstructed by the spot film device, to allow the table to be used for any purpose.

The present invention contemplates the provision of means substantially instantly and selectively operable to dispose either the fluorescent screen 69 or a ray sensitive sheet or film of photographic material in position for picture making purposes in the penetrating rays 56. To this end, the housing 57 contains mechanism comprising carriage means 72 for receiving and supporting a ray sensitive film cassette 73, and for shifting the same on and longitudinally of the frame 57 from a normally retracted position, at a loading station opposite the opening 68′, into any selected one of a number of relatively shifted picturing positions at the picturing station beneath the panel 69, the mechanism being then operable to return the carriage means to its retracted position, in which, of course, the screen 69 may be employed to produce visible shadow pictures of the examination object.

Ray sensitive film and film cassettes are normally of rectangular shape, having somewhat greater length than width. The present invention contemplates carriage means which will accept the cassette 73 in position for projection and retraction to and from picturing position in the direction of either its long or short dimension. To this end, the carriage means 72 may comprise a main carriage frame 74 movable in and longitudinally of the support frame 57 between retracted or loading position and projected picturing position, and an auxiliary cassette carrier 75 supported on and movable with the carriage frame 74, the cassette carrier being shiftable on the carriage frame transversely of the direction of the projecting and retracting movement of the carriage frame.

The carriage frame 74 (FIGS. 3 to 10) may conveniently comprise sheet metal formed to provide upstanding spaced apart side walls 76, 76′ and spaced end walls 77 and 77′, and an inwardly extending peripheral flange 78 formed on the lower edges of the upstanding side and end walls, to provide a supporting wall. Frame carrying rollers 79 and 79′, adapted for rolling engagement with tracks 80 and 80′ secured in the main frame 57, may be mounted on the opposite end walls 77 and 77′ of the carriage frame, said rollers 79′ being mounted in spaced relation directly upon the frame member 77′, preferably adjacent its opposite ends, while the rollers 79 are mounted in like spaced relation upon a rebent, box-like flanged extension 81 of the frame member 77. The extension 81 may be formed with terminal flanges 82 adjacent the rollers 79. Guide rollers 83 may be supported on said terminal flanges, such rollers being thus supported in position to rollingly engage spaced guide portions 84 and 84′ of the track 80, in order to secure the carriage frame 74 against movement transversely of the main frame 57 during its projection and retraction on the tracks 80 and 80′.

The cassette carrier 75 may comprise a pair of sheet-metal frame components 85 and 85′, including medial portions 86 and 86′ and spaced apart, telescopically interfitting leg portions 87, 87′ and 88, 88′ at the opposite ends of said medial frame portions and provided with manually releasable latching means 89, whereby the components 85 and 85′ may be adjusted to minimum size to support the cassette 73 with its long dimension extending in the direction of movement of the carriage frame 74, as shown in FIGS. 5, 8 and 9, or to intermediate size to support the cassette 73 with its long dimension extending transversely of the direction of carriage movement, as shown in FIG. 10 of the drawings, the cassette, when in transversely mounted position, being centered in the expanded carried 74, as by means of suitable alining shoulders 90 formed in the frame component 85′. By expanding the carrier 74 to maximum adjusted size, limited by the size of the carriage frame 74, the carrier can be made to accommodate a larger cassette in position extending transversely of the direction of carriage frame movement.

The latch means 89 (FIG. 11) may comprise latch members 89R supported on leaf springs 89S mounted, one on each of the frame component legs 88, in position to latchingly engage in any selcted one of several latching notches 89N–1, 89N–2, 89N–3, respectively determining minimum, intermediate and maximum carriage sizes. Depressible latch releasing handles 89T may be provided for releasing the members 89R from engagement in the notches.

The medial portion 86 of the frame component 85 may be formed with an outwardly and downwardly bent flange 91 forming a handle to aid in manual adjustment of the carrier. The medial portion 86′ of the frame component 85′ may be formed with an inturned flange 91′ in position, between the shoulders 90, to overlie an edge of the cassette 73, on one side thereof, to hold the same in mounted position in the frame. The medial portion 86 of the component 85 may also be formed with an upwardly extending flange 92 carrying a leaf spring 93 in position to engage the other side of the mounted cassette 73, to thereby retain the cassette in mounted position in the carrier.

When a small cassette 73 is mounted longitudinally in the carrier, as shown in FIGS. 5, 6, 8 and 9, the carrier 75 may be shifted transversely on the carriage frame 74 between and adjusted in the positions shown in FIGS. 8 and 9, or it may be disposed in centered position medially of the positions shown in FIGS. 8 and 9. Suitable latching means 94 may be provided for yieldingly securing the cassette carrier on the carriage frame in each of said transversely shifted and centered positions.

The latching means 94 may comprise latching rollers 94R yieldingly supported on the carrier 75, as on the component legs 87′ and 88′. As shown, each roller is supported on a leaf spring 94S which in turn is mounted on a bracket 94B secured to a leg of the carrier component in position to selectively engage the latching roller in any of several latching openings 94N–1, 94N–2, 94N–3 and 94N–4, spaced apart on the overlying side of the carriage frame, said openings respectively corresponding with and defining: The FIG. 8 position and also the centered position of the carrier when adjusted to maximum size to accommodate a large cassette; the FIG. 10 position; the centered position when the carrier is adjusted to minimum size; and the FIG. 9 position.

It will be seen that one lateral half portion of the cassette enclosed film shown as a dot and dash rectangle in upper left corner of cassette may be centered in the ray beam 56 at the picturing station, when the carrier is in the FIG. 8 position, while the other lateral half portion of the cassette enclosed film will be centered in the beam at the picturing station when the carrier is in the relative position shown in FIG. 9. When the cassette 73 is mounted transversely in the carrier, as shown in FIG. 10, or when the carrier is expanded to maximum size to receive a larger cassette, the cassette will be supported only in centered position with respect to the carriage frame 74.

Selectively operable stop means 95, shown more particularly in FIGS. 29–35, may be provided for stopping the carriage frame 74 selectively in positions of maximum, minimum and intermediate projection measured from retracted position. By suitably selecting the projected position of the carriage frame in the housing, and by adjusting the transverse position of the carrier 75 in the carriage frame 74, any desired quarter or half portion or all of a cassette enclosed sheet of ray sensitive material may be centered at the exposure station. By successively adjusting the relatively shifted positions of the carrier and carriage frame, the several adjacent zones of a ray sensitive cassette enclosed layer may be successively centered for exposure at the picturing station.

In this connection, the four views, FIGS. 14–17 inclusive, illustrate the successive exposure of the quarter sectional areas of a ray sensitive sheet by stopping the carriage frame 74 alternately in its positions of minimum and maximum projection, while successively adjusting the carrier 75 in its FIG. 8 and FIG. 9 positions.

The two views comprising FIGS. 18a and 18b illustrate the successive exposure of opposite end sections of a cassette enclosed ray sensitive sheet by centering the cassette carrier 75 in the carriage frame, with the cassette 73 extending longitudinally, and by successively adjusting the stop means 95 to stop the carriage frame 74 in positions of minimum and maximum projection. FIGS. 19a and 19b illustrate the exposure of opposite side sections of a cassette enclosed sheet, by stopping the carriage frame in its position of medial projection while successively disposing the carrier 75 in the FIG. 8 and FIG. 9 positions. By mounting the cassette 73 transversely, as shown in FIG. 10, and by successively stopping the carriage frame 74 in its positions of minimum and maximum projection, successive exposures of the sort illustrated in FIGS. 20 and 21 may be accompilshed on a cassette enclosed sheet of ray sensitive material.

By centering the carrier 75 in the carriage frame and by stopping the frame in its position of medial projection, exposure of the entire cassette enclosed sheet may be accomplished, as indicated in FIGS. 22 and 23 respectively, when the cassette is mounted longitudinally, as shown in FIGS. 8 and 9, or transversely, as shown in FIG. 10.

By adjusting the carrier 75 to its position of maximum expansion within the carriage frame 74, a large cassette may be mounted in the carrier, in order that exposures of the sort shown in FIGS. 24, 25 and 26 may be accomplished, respectively, by stopping the carriage frame 74 in its positions of minimum, maximum and medial projections. The large cassette, of course, can only be mounted with its long dimension extending transversely of the direction of carriage projecting movement.

It will be understood, of course, that the shutter box 59 should be adjusted to confine the ray beam 56 to appropriate sectional size and configuration at the exposure station, to correspond with the ray sensitive film exposure areas shown in FIGS. 14–26.

As shown more particularly in FIG. 29, a preferably helical tension spring 96 is employed for normally and yieldingly urging the carriage frame 74 toward projected position, said spring being anchored at one end in the frame 57, as on an anchorage pin 97 secured in said frame adjacent the rear wall 66 thereof. Means is provided for connecting the opposite end of the spring 96 with the carriage frame 74, in order to normally urge the same forwardly in the main frame 57 in a direction away from the rear wall 66 thereof. As shown, the end of the spring 96, remote from the anchorage pin 97, may be fastened to a movable pulley bracket 98 in which a pulley 99 is turnably mounted. A power transmission line comprising a cord or cable 100 is connected at one end to the bracket 98, passing thence around a pulley 101a turnably mounted about a stationary axle pin 101 in the frame 57 adjacent the forward end thereof, then around the pulley 99 and again about a pulley 101b, on the pin 101, the other end of the cable 100 being connected to the carriage frame 74, as at the front end thereof. It will be seen that the helical spring 96 is thus connected to yieldingly draw the bracket 98 toward the anchorage pin 97, to thereby urge the pulley wheels 99 and 101 apart, thus urging the cable 100 to draw the carriage frame 74 from the rearward toward the forward end of the frame 57.

Separate spring means is provided for shifting the carriage frame 74 and picturing material carried thereby, against the influence of the projecting spring 96, in order to return the carriage frame from projected to retracted position in the rearward portions of the frame 57. For this purpose the present invention contemplates improved driving spring means 102 (FIGS. 3, 5, 36 and 40) of novel construction and comprising a series of separate, adjacently disposed, spiral spring components 103, each housed in a corresponding wheel 104 (FIGS. 40 and 44) which serves to drivingly connect its associated component with the next adjacent component of the series, said series of components forming a sectional power spring assembly drivingly connected at one end, through suitable coupling means 105, with a spring tensioning motor M, the opposite end of said spring assembly being drivingly connected, through a selectively operable coupling clutch structure 106 (FIGS. 29 and 40), with a driving shaft 107 carrying a pulley wheel 108 having a preferably helical cable carrying groove 109. A frame shifting cable 110 is connected at one end at an anchorage 111 on the pulley 108, and passes thence several times around the pulley in the helical groove 109. From the pulley 108, the cable 110 may extend around a pulley 112 turnably mounted upon a stationary axle pin in the main frame 57 near the front end thereof, the cable 110 passing thence longitudinally of the frame 57 adjacent the side wall 63 thereof, and around another guide pulley 113 adjacent the rear wall 66 thereof, the end of the cable 110 being secured in an anchorage 114 on the carriage frame 74 in order to draw the same toward the back of the frame 57 against the contrary influence of the spring 96, whenever and so long as the coupling clutch means 106 is actuated to apply the driving force of the spring means 102 to the cable pulley 108.

Each of the spring components 103, as shown more particularly in FIG. 44, is provided with hooks 115 and 115' respectively, at the inner and outer ends of the helical component. The component housing wheels 104, as shown more particularly in FIG. 40, may each comprise a central hub 116 formed with a spring engaging shoulder 116' adapted for hooking engagement with the hook 115 at the inner end of the component which is mounted upon said hub. Each housing wheel also embodies a web 117 formed on the hub 116 at an end thereof, in position overlying one side of the component connected on the hub, each wheel having a peripheral rim 118 formed on and extending outwardly of the web 117 on the side thereof opposite the hub 116. The rim of each wheel 104 thus may encircle and enclose the spring component 103 immediately adjacent the hub connected component, said adjacent components being disposed on opposite sides of the web 117. The rim portion 118 of each wheel is formed with a slot 119 extending therein from the web to and opening at the web remote edge of the rim, said slot being sized to drivingly receive the hook 115' at the outer end of the component that is assembled and housed within the rim.

The rim portion 118 may be omitted from the endmost spring mounting wheel 104 at one end of the spring assembly 102, and a mounting embossment 120 may be formed on the web 117 of said endmost mounting wheel, on the side of said web opposite the spring mounting hub 116 thereof. All of the mounting wheels 104, except the endmost wheel, are turnably mounted in end to end relationship, by means of their hubs 116, upon a shaft 121, the endmost wheel being drivingly secured to the shaft 121, as by means of set screws 122 in the boss 120, or other suitable splining means. The shaft 121 is turnably mounted on the frame 57, as in bracket means 123 secured on said frame along one side thereof, as on the flange 63', the shaft 121 being supported in a suitable bearing 124 mounted in a pedestal portion 125 of the bracket 123.

The hub 116 of the housing wheel 104 (FIGS. 40 and 43) at the end of the spring assembly remote from the wheel 104', may be drivingly secured in a collar 126 by any suitable fastening expedient, said collar 126 forming one end of a turntable frame, including a plate 127 spaced from the collar, and a pair of rods 128 secured at their opposite ends in the collar and plate to drivingly interconnect and support the same in spaced relation, the plate 127 being formed with a stem 129 disposed in coaxial alinement with the shaft 121 and being turnably supported, as in a bearing 130, carried in a pedestal 131 spaced from the pedestal 125 in the bracket means 123. An end of the shaft 121 remote from the bearing 124 is turnably supported, as at 132, in the plate 127. Between the collar 126 and the plate 127 the shaft 121 may be formed with screw threads 133 for engagement with corresponding threads formed in a nut 134, said nut being secured on and centrally of a disc or plate 135 having openings 136 formed therein for the sliding reception of the rods 128.

The motor M may be supported on pedestal 137 formed on the bracket means 123 in position spaced from the pedestal 131; and the motor may be drivingly connected with the frame member 127 by means of a suitable coupling or clutch 138 drivingly interconnecting the shaft 139 of the motor with the shaft 129 of the turnable frame.

By holding the shaft 121 against turning movement in the pedestal 125, as by operation of the clutch means 106, it will be seen that the spring components 103 may be tensioned to any desired extent within the capacity thereof by operating the motor M. When the motor is actuated it will turn the endmost component mounting wheel 104 with which the motor is drivingly connected by the coupling 138 and the frame comprising the components 126, 127 and 128. When the spring components have been tensioned to the desired extent, the motor may be stopped. Thereupon, the tensioned spring may be employed to accomplish any desired driving operation, such as the retraction of the carriage frame 74 against the influence of the spring 96, by operating the clutch means 106 to release the shaft 121, and simultaneously to drivingly connect the same with the pulley 108.

In order to control the operation of the motor M in accordance with the tensioned condition of the spring components 103, a normally closed microswitch 140 (FIG. 43) having an actuating button 141, may be connected to control the supply of energizing power to the motor M. The microswitch may be mounted in the frame means 123 in position to be actuated by an axially movable stem 142 supported in a carrying sleeve 143 formed on the frame means 123 adjacent the microswitch. A grooved member 144, which snugly receives the edge of the disc 135, may be secured on the stem 142 so as to move the stem axially in response to movement of the disc 135 on the shaft 121. In this connection it should be understood that the plate 135 will move in a direction to shift the stem 142 from retracted to projected switch opening engagement with the switch actuating member 141 when the motor M is operated to turn the frame components 126, 127 and 128 with respect to the shaft 121 in tensioning the spring components 103. Accordingly, the switch actuating stem 142 may serve to open the switch when the components have become tensioned to a desired extent by operation of the motor M. Upon release of the anchored shaft 121 to apply the tensioned spring components to drive a load, rotation of the threads with respect to the disc 135 will move the disc on the threads 133 in a direction to retract the stem 142 from the member 141, thereby allowing the switch 142 to close and thus actuate the motor to retension the spring components 103.

As shown more particularly in FIGS. 40, 41 and 42, the coupling clutch means 106 comprises a series of spring elements 145, 146 and 147. The spring 145 is selectively operable to anchor the shaft 121 against actuation by the power springs 103, or to release the shaft 121 for turning movement. The spring 146 serves to drivingly connect the shaft 121 with the load connected shaft 107. The spring 147 operable to control the selective operation of the element 146 regardless of the position of angular displacement to which said coupling element 146 may be turned when conditioned to couple the driven and driving shafts 107 and 121.

The coupling clutch structure 106 comprises cylindrical hub members 148, 149, 150, 151 and 152 carrying the snubbing spring elements 145, 146 and 147 on the driven and driving shafts 107 and 121.

The member 148 is fastened securely upon a face of the pedestal 125 in position to turnably receive therethrough the end of the shaft 121 which projects through and beyond said member 148.

The member 149 is secured fast upon the projecting end of the shaft 121, as by means of a pin 153, the member 149 being thus supported immediately adjacent and outwardly of the member 148. The pulley carrying driven shaft 107 may be journalled for rotation in a bearing 154 mounted in a pedestal 155 spaced from the pedestal 125 in the bracket means 123, the pulley remote end of the shaft 107 being turnably mounted, as in a bearing 154', supported in a cavity formed in the member 149 so that the driven and driving shafts 107 and 121 are supported firmly in coaxial, end to end alinement, but free for relative rotation except as controlled by the springs 145, 146 and 147.

The hub member 150 is secured fast upon the end of the driven shaft 107, as by means of a pin 156, the member 150 being supported for relative turning movement immediately adjacent the shaft supporting end of the member 149.

The members 151 and 152 are turnably supported on the shaft 107 in end to end abutting relationship, the member 151 extending immediately adjacent and in contact with the member 150.

The hub members may be held in end to end engagement, as by means of a spacing collar 157 mounted on the shaft 107 between the bearing 154 and the facing end of the member 152. The members 148 and 149 are of like diametral dimension and form a cylindrical seat for the snubbing spring element 145, the spring being seized normally to snugly and resiliently, yet yieldingly embrace the cylindrical spring seating surfaces of the members 148 and 149. One end of the spring element 145 is anchored to the element 148, as by engagement of the spring end in an anchoring notch 158 formed in said member, the opposite end of the spring element 145 forming an outwardly extending finger 159. The spring element 145 is coiled upon the members 148 and 149 so as to snubbingly tighten itself thereon in response to turning movement of the shaft 121 under the driving influence of the spring means 102. By moving the projecting end 159 of said spring, in a direction to expand the coils thereof which encircle the member 149, the spring may be released from the member 149, which consequently may turn freely with the shaft 121 under the driving influence of the spring means 102.

The hub member 150 is preferably of slightly smaller diameter than the member 149. One end of the spring element 146 tightly embraces and is thus frictionally anchored on the member 149. The opposite end of the spring element 146 snugly and resiliently, yet yieldingly, embraces the member 150, the terminal end of the spring element being formed with an outstanding clutch actuating finger 159'. The spring element 146 thus drivingly engages the cylindrical surface of the member 150 in self tightening fashion, to thereby turn the driven shaft 107 in response to turning movement of the driving shaft 121, the spring element 146 being coiled in a direction to accomplish such self tightening action. By moving the projecting finger 159' of the spring element 146, in a direction to expand the coils thereof, the spring may be released from driving engagement with the member 150.

Means is provided for selectively releasing the spring element 146 from the member 150 and for permitting it to contract thereon in self tightening fashion, while simultaneously anchoring the spring element 145 on and releasing the same from the member 149. To this end, the hub members 151 and 152 preferably have like diametral dimension and carry the snubbing spring element 147 thereon. The member 152 has a peripheral flange 161 at one end thereof, said flange carrying an outwardly extending actuating pin 162 (FIG. 40) and a spring release finger 163 extending in position outwardly of and overlying the spring elements 146 and 147, said finger having a portion disposed in position to engage the outstanding end 159 of the spring element 145. The spring element 147 is sized normally to snugly and resiliently, yet yieldingly embrace the cylindrical spring seating surfaces of the members 151 and 152 so that the spring forms a one way driving connection between said members, the spring element being coiled thereon so as to permit the member 151 to turn freely, with respect to the member 152, within the embracing portions of the spring element 147, when the shaft 107 is turningly driven by the shaft 121.

The member 151 has a peripheral rib 161' at the end thereof adjacent the shaft driving member 150, said rib carrying a spring actuating plate 164 (FIGS. 40, 41) formed with a notch 165 in position receiving the clutch actuating finger 159'. Accordingly, as the member 152 (FIG. 42) is turned in a direction to release the spring element 145 from anchoring engagement with the member 149, the member 151 will not be driven with the member 152, and will not affect the condition of the spring 146. The spring 146, accordingly, will be in condition to assure self tightening driving connection between the shafts 121 and 107, as soon as the spring 145 is released from the member 149. As the shaft 107 is thus driven, the finger 159' of the spring 146 will engage actuating plate 164 and thereby turn the member 151 in unison with the member 150 and the shaft 107. Thus, said member 151, at all times and regardless of the angular position of the member 150 with respect to the member 152, will always be in position to expand the spring element 146 and release driving engagement thereof with the member 150 in response to turning movement of the member 152 in a direction to release the anchoring spring element 145 upon the hub element 149. The slot 165 in plate 164 provides lost motion, whereby the spring element 146 will drivingly engage plate 164 and the member 150 as the anchoring spring element 145 is released from the hub 149. The spring 146 will be drivingly disengaged from the shaft driving hub 150 after anchoring engagement of the spring element 145 with the hub 149.

Spring actuating movement of the member 152 (FIG. 42) may be accomplished by toggle mechanism comprising an arm 166 (FIGS. 28, 30, 40) rockably supported on a pivot 167 mounted in the bracket means 123, the arm 166 being formed, at one end, with an opening 168 for drivingly receiving the pin 162 therein. The end of the arm 166 remote from the opening 168 may carry an actuating pin 169; and the arm 166 may be connected with a toggle or over-center spring 170 for yieldingly holding the arm resiliently in one or other of the limit positions shown in FIGS. 30 and 31, as determined by stop pins 171 which may be mounted on the bracket means 123. When the arm 166 is in the position shown in FIG. 30, the clutch structure 106 will be conditioned to release the driving shaft 121 and to drivingly connect the same with the driven shaft 107, thereby applying the spring means 102 to retract the carriage frame 74 against the influence of the frame projecting spring 96. When the arm 166 is in the position shown in FIG. 31, the clutch structure 106 will be in condition to anchor the shaft 121 (FIG. 42) against turning movement. The shaft 107, at such time, is drivingly disconnected from the shaft 121.

Suitable means is provided for selectively shifting the arm 166 between the limit positions shown in FIGS. 30 and 31, and for simultaneously adjusting the stop means 95 (FIG. 29). To these ends, as shown more particularly in FIGS. 3, 29 and 33–35 and 39, the carriage frame may be provided with stop buffer means 172 embodying oppositely facing stop members 173 and 173' in position to engage the selectively adjustable stop means 95 to limit projecting movement of the frame 74 at the exposure station 68, and to engage the rear wall 66 (FIGS. 3, 36 and 39) of the frame 57, as a cooperating stop, to determine the retracted position of the carriage frame at the loading station 68'. The stop means 172 (FIG. 39) may conveniently comprise an air pressure cylinder 174 secured on a bracket 175 attached to the frame extension 81, said cylinder extending in the direction of longitudinal frame projecting and retracting movement. The cylinder contains a piston 176 carried on a stem 177 extending coaxially within the cylinder and having outwardly extending opposite ends 178 and 178' sealed by means of suitable packing gland structures 179 and 179'. The cylinder is provided with adjustable air flow vents 180 and 180' at its opposite ends adjacent the packing gland structures 179 and 179'.

The stop members 173 and 173' (FIG. 39), which preferably comprise pads of rubber or other resilient material, are mounted at the terminal ends of the stem portions 178 and 178'. By suitably adjusting the vents 180 and 180' the carriage frame 74 may be brought gently to buffered standstill condition in retracted, as well as in any projected position, as determined by the stop means 95. A spacing sleeve 174' may be applied around the stem end 178, between the member 173 and the gland 179, to thereby apply frame stopping force from the member 173 directly to the cylinder 174, through the gland, thereby relieving the stem and piston of such force. A resilient spacing collar 174'R may likewise be applied to the stem end 178'.

In order to selectively adjust the stop means 95 and to control the operation of the clutch structure 106, a shaft 181, connected with a manually operable handle 182 (FIGS. 5 and 30–32), may be turnably mounted in the frame 57 adjacent the front wall 65 thereof, said shaft carrying a pair of radially extending arms 183 and 184 fixed thereon. The outer end of the arm 183 may be drivingly connected with the clutch control member 166, as by means of a linkage, including a lever 185 (FIGS. 28 and 32) and a connecting rod 186. The lever may be pivoted on the frame 57, as by means of a pin 187 (FIGS. 28, 30 and 31) mounted on said frame, an end of said lever 185 being formed with a slot or notch 188 in position to receive and thereby drivingly connect the lever with the pin 169. The rod member 186 may be pivotally connected at its opposite ends respectively with the arm 183 and the lever 185. As a consequence, by shifting the handle 182 to the positions shown in FIGS. 30 and 31, the clutch means 106 may be actuated respectively to couple the shafts 107 and 121, to thus retract the carriage frame 74 to loading position, and to uncouple the shafts to thereby permit projection of the carriage frame.

The carriage frame 74 may be stopped in any one of a plurality of relatively shifted positions in the picturing station 68 by selectively operating the stop means 95 (FIGS. 30–36 and 39), which, as shown, may comprise an arm 189 pivotally mounted for turning movement about an axle pin 190 supported on the frame 57, said arm 189 carrying a shoe 191 and being normally biased, as by means of a spring 192, toward a frame stopping position shown in solid lines in FIG. 30, in which the shoe 191 extends in the path of movement of the stop member 173, to thereby stop the frame 74 in a position of minimum projection. As shown, the arm 189 may be held in frame stopping position against the influence of the spring 192 by means of a position determining lever 193 (FIGS. 5 and 30, 31) pivoted for rocking movement on a support pin 194 mounted in the main frame 57 and drivingly connected with the arm 184 (FIG. 32). By rocking the lever 193 on its pivot, the member 189 may be shifted to the position shown in FIGS. 31 and 34, in which the shoe 191 is displaced outwardly of the path of movement of the stop member 173. Accordingly, when the member 189 is in such displaced position, the carriage frame 74 may be moved to a position of maximum projection determined by the engagement of the stop member 173 with a cooperating stop element which may conveniently comprise the front wall 65 of the frame.

In order that the stop member 189 may be shifted alternately to the control positions shown in FIGS. 30 and 31 and 33 and 34, as the result of successive clutch actuating operations of the handle 182, the lever 193 may be rocked by means of a driving cam 195 through an intermediate lever 198. The cam 195 is indexingly turnable in response to actuation of the handle 182, as by means of a ratchet wheel 196 drivingly connected with the cam, and a pawl member 197 pivotally connected with the arm 184 (FIG. 32). The cam 195 may have square peripheral configuration and may be drivingly associated with an intermediate lever 198, rockable on a pivot pin 199 supported on the frame 57, the lever 198 having an end connected with the position determining lever 193, and a cam following end adapted alternately to be engaged by the corners and the sides of the square cam. Obviously, any other suitable actuating means may be provided for moving the lever 193 alternately to the positions shown in FIGS. 30 and 31 in response to successive clutch actuating movement of the handle 182.

Such alternate operation of the stop position determining lever 193 is desired in order to accomplish alternate projection of the carriage frame 74 to positions of minimum and maximum projection, so as to permit the exposure of cassette mounted film in the sequences shown in FIGS. 14-17, FIGS. 18 and 19, FIGS. 20 and 21, and in FIGS. 24 and 25.

In order to assure that the handle 182, when actuated to shift the mechanism from the position shown in FIG. 30 to the position shown in FIG. 31, and vice versa, may not be returned to starting position before being fully turned to the shifted position, the arm 183 may be formed with a nose 183' formed with a pocket 184' facing radially away from the axis of the shaft 181 on which said arm is rockably mounted. A toggle detent 185' is pivotally mounted for turning movement about an axis 186' spaced from the axis of the shaft 181, said detent having a nose adapted for engagement in the pocket 184', and being normally urged as by means of a spring 187', to present the nose of the detent 185' midway between the positions occupied by the pocket 184', when the mechanism is in the limit positions shown in FIGS. 30 and 31.

The spacement of the detent axis 186' from the axis of the shaft 181 is slightly less than the sum of the distance between the bottom of the pocket 184' and the axis of the shaft 181, and the distance from the axis 186' and the tip of the nose of the detent 185'. In turning the handle 182 from one limit position, such as that shown in FIG. 30, toward the other limit position, movement of the nose 183' will first tilt the detent 185' about the axis 186' until a position of the arm 183 is reached permitting the nose of the detent 185' to enter the pocket 184'. Such position is reached after the pocket 184' has passed through the plane that is common to the axis 186' and the axis of the shaft 181.

When the nose of the detent 185' thus enters the pocket 184' it will be seen that the movement of the handle 182 cannot be reversed thereafter until the limit position shown in FIG. 31 is reached. As such limit position is reached, the nose of the detent 185' will be released from the pocket 184', thereby permitting the detent 185', under the influence of the spring 187', to assume its normal position in line with the axis of the shaft 181, as shown in FIG. 30, the detent 185' being shown in FIG. 31 in position immediately prior to the release of its nose from the pocket 184', such release occurring in response to slight additional movement of the handle 182 and the arm 183 in a counterclockwise direction, viewing FIG. 1.

In order to stop the carriage frame 74 in a position of medial projection, so as to permit film exposure of the entire sheet of ray sensitive material, as shown in FIGS. 22, 23 and 26, the stop member 189 may be turned 180 degrees from its solid line position to the dotted line position shown in FIG. 30 (also FIG. 33 to FIG. 35), such dotted line position being determinable by engagement of the member 189 with a stop pin 200 (FIG. 35) mounted in the frame 57 and against which pin the member 189 will be urged by the action of the spring 192 acting as a toggle or over-centering device. The member 189 may thus be shifted to the dotted line position shown in FIG. 30 by means of a control handle 201 (FIGS. 5, 33–36) formed on the upwardly projecting end of the pivot pin 190 upon which the stop member 189 is secured. The handle 201 is preferably provided with an index pointer 202 adapted to indicate the adjusted position of the stop member 189 on a square formed on the frame 57 adjacent the index pointer.

As shown more particularly in FIG. 12 (FIGS. 3 and 4) of the drawings, cassette ejecting means 203 may be provided on the frame in position operable to displace the cassette 73 mounted in the carrier 75 upwardly, when the carriage means 72 is in retracted position at the loading station 68', to thereby facilitate removal of the cassette from the carrier. To this end, the ejecting means may comprise a length of wire bent to form a bellcrank lever pivotally secured upon the bottom wall of the frame 57 substantially medially of the loading zone 68', said lever including a cassette ejecting arm 204 adapted to normally lie against the bottom wall of the frame 57, and an upstanding arm 205 normally urged, as by means of a biasing spring 206, in a direction to resiliently press the arm 204 toward retracted position against the bottom wall of the frame 57. An actuating cable 207 is connected with the arm 205 and is guided thence along and adjacent the rear, side and front walls 66, 64 and 65 of the frame, by means of guide pulleys 208 turnably mounted in the frame adjacent the opposite ends of the side walls 64, the end of said cable 207, remote from the arm 205, being connected with a manually operable handle 209 shiftably mounted at the front of the frame 57, as adjacent the clutch and stop actuating handle 182, so that by pressing the handle 209 (FIGS. 12 and 1) the cassette ejecting bellcrank means 203 may be actuated against the influence of the biasing spring 206 to perform its cassette ejecting function.

Suitable spring means, operatively associated with the pivots 71 (FIGS. 3, 5 and 12), may be provided for normally urging the frame 57 toward its parked position, as indicated in dotted lines at 57' in FIG. 2. From such parked position, the frame 57 and mechanism assembled thereon may be moved downwardly, by manual action, to the horizontal operating position above the table top 52, as shown in solid lines in FIG. 2, as determined by suitable cooperating stops 210 (FIG. 5) formed on the brackets and on the support arm 60, suitable latch means 211 being provided for locking the frame 57 in operating position in the support frame 54. As shown, the latch means 211 (FIGS. 5, 12, 13) may comprise a bolt 212 mounted in the rear wall 66 of the frame 57 and movable axially therein for detachable engagement with a keeper formed in the support frame structure opposite the bolt carrying portion of the frame 57. The bolt 212 may be connected on the end of an actuating stem 213 extending from the bolt along and inwardly of the side wall 64 of the frame 57, the bolt remote end of the stem 213 projecting forwardly of the front wall 65 of the frame 57 and being formed with an operating knob or handle 214 (FIGS. 3, 5, 12, 13). A preferably helical spring 215 may be provided in position encircling the stem 213 to urge the same in a direction to press the bolt 212 normally into keeper engaging position, so that the bolt will latch itself, with its cooperating keeper, as and when the frame 57 is drawn to horizontal operating position. The latch 211, of course, may be released to permit the return of the frame 57 to upright parked position, merely by manually pulling upon the knob 214 at the front end of the frame.

Should the latch 211 become released with the carriage means 72 in projected position, it will be seen that said carriage means, by the action of gravity, will move to retracted position against the influence of the relatively weak projecting spring 96; and since the carriage means 72, with ray sensitive material cassette loaded therein, represents a considerable mass, such return movement to retracted position when the frame 57 reaches upright parked position, may result in damage to the carriage means. To obviate such possibility, the present invention provides means for assuring the release of the latch means 211 and consequent movement of the frame 57 to upright parked position, only when the carriage means is in its retracted position at the loading station 68'. To this end, a latching arm 216 (FIGS. 5, 12, 13) may be pivotally supported in the frame 57, adjacent the bolt 212, said latching arm being formed with a detent 217 and being normally urged, as by a spring 218, in a direction to engage the tooth 217 with the bolt 212 to hold the same in latching engagement with its detent. The arm 216, as shown more especially in FIG. 5 of the drawings, normally extends into the space that will be occupied by the carriage means 72 when the same is in retracted position. As a consequence, the arm 216 will be actuated by the carriage means 72 against the influence of the spring 218 so as to withdraw the detent 217 from latching engagement with the bolt 212, thereby freeing the bolt 212 for latch releasing movement whenever and only when the carriage means is in retracted position.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being preferred embodiments for the purpose of illustrating the invention.

The invention is hereby claimed as follows:

1. Spot film mechanism comprising a frame defining a storage area and a work station spaced from said storage area, a carriage movable on said frame between a retracted position in said storage area and a projected position at said work station, biasing means initially stressed to urge said carriage toward one of said positions, a power spring, means to keep the power spring energized to provide a source of immediately available energy, and means to connect the power spring to the other of said positions against the influence of said biasing means and to re-energize said biasing means for a subsequent operation.

2. Spot film mechanism comprising a frame defining a storage area and a work station spaced from said storage area, a carriage movable on said frame between a retracted position in said storage area and a projected position at said work station, biasing means to normally urge said carriage toward one of said positions, a power spring operable to move the carriage back to the other of said positions against the force of the biasing means, and a clutch selectively operable to drivingly connect said power spring with the carriage, and to disconnect the power spring from the carriage after the carriage is moved back to said other position.

3. Spot film mechanism as set forth in claim 2 wherein the clutch comprises a pair of adjacently disposed, coaxially alined wheels drivingly connected respectively with said motive means and said carriage, a helical driving spring resiliently embracing and having portions contractingly engaging the peripheral surfaces of said wheels to drivingly interconnect the same, and a clutch release member connected with said spring and turnable in a direction to expand the same to release the driving engagement thereof with the wheel embraced thereby.

4. Spot film mechanism comprising a frame providing a work station and a storage area spaced therefrom, a carriage movable on said frame between a projected position at said work station and a retracted position at said storage region, a work spring energized normally to urge the carriage toward one of said positions, and power spring means operable to move the carriage to the other of said positions, and to re-energize the work spring, said power spring means embodying a series of spiral coil spring elements and means drivingly connecting said elements in tandem or cascade relationship.

5. Spot film mechanism comprising a frame providing a work station and a retracted region spaced therefrom, a carriage movable on said frame between said work station and said retracted position at said storage region, a work spring normally energized to urge said carriage toward one of said positions, power spring means operable to move the carriage to the other of said positions, and to re-energize the work spring, a clutch selectively operable to drivingly connect one end of said power spring means to the carriage, means for disconnecting the clutch from the carriage and from said one end of said power spring means when disconnected from said carriage, and motive means drivingly connected with the other end of said power spring means and operable to tension said power spring means to maintain a predetermined energy content in the spring means.

6. Spot film mechanism comprising a frame providing a work station, a carriage movable on said frame between a retracted position remote from said station and a projected position at said station, and an expansible cassette carrier supported on said carriage and embodying two parts telescopically contractible and expansible in a direction transversely of the direction of movement of the carriage on said frame.

7. A spot film tunnel for X-ray apparatus, said tunnel comprising:
 (a) a tunnel guide frame having a projected exposure or work station and a retracted or storage region for a cassette frame;
 (b) a cassette carriage supported in the guide frame and movable between the projected work station and the retracted storage region at the will of an operator;
 (c) a helical spring having one end anchored on the guide frame and the other end moveable to apply a force to the cassette carriage;
 (d) a block and tackle having one pulley block movable and tied to the free end of the spring and the other block pulley pivotally anchored with a flexible cord around the pulleys and having one end tied to the movable block and the other end tied to the cassette carriage, whereby the spring when stressed and extended will pull on the tackle to cause the cord to bias the cassette carriage toward the projected work station; and
 (e) control means operable at the will of the operator for
  (1) extending and stressing the spring and holding the spring in such stressed position with the cassette carriage held in retracted position, or for (2) releasing the spring and cassette carriage to permit the spring to contract and to move the cassette carriage from retracted position to projected working position.

8. A spot film tunnel, as in claim 7, in which said control means includes:
(1) an electric motor to be energized from an external source;
(2) energy storage power spring means;
(3) means responsive to the stored energy condition of said power spring means for controlling the connections between the motor and said external source, to maintain said power spring means in energized condition; and
(4) coupling means operative between the power spring means and the cassette carriage to return the carriage from its projected working position to its retracted position, while simultaneously energizing and stressing said helical spring attached to the block and tackle.

9. Spot film mechanism, as in claim 6, in which the movable carriage consists of a frame of fixed dimensions, and the expansible cassette carrier consists of a frame disposed on and nested within the limits of the movable carriage frame, and said cassette carrier frame having two cooperating said portions telescopically adjustable, transversely to the direction of movement of the movable carriage, to receive and hold cassettes of predetermined different dimensions.

10. Spot film mechanism, as in claim 6, in which the movable carriage consists of a frame of fixed dimensions, and the expansible cassette carrier consists of a two-part telescopic frame, each of such two parts being also movable, relative to and on the movable carriage frame, to locate and to position cassettes of different dimensions in various locations on the carrier and with the respective major axes of the cassettes variously oriented on the movable carriage.

11. Spot film mechanism, as in claim 10, in which one part of the expansible telescopic cassette carrier embodies two retaining and guide lugs which mechanically link the movable carriage to prevent separation of the cassette carrier from the carriage, but leave the carrier frame free to be physically adjustably shifted on and within the carrier frame to a selected one of a plurality of predetermined positions;

and in which the second part of the expansible telescopic cassette carrier is, in turn, mechanically linked to said first part of the cassette carrier by two retaining and guide elements that permit only sliding endwise relative movement between the two parts of the cassette carrier from a compressed relation of minimum dimension to an expanded relation of maximum dimension;

and in which latching means are mounted on the first part of the cassette frame for releasably latching said first part of the cassette frame to the carrier frame; and in which latching means are mounted on the second part of the cassette frame to releasably latch such second part to the first part of the cassette frame in any selected position of the cassette frame.

12. Spot film mechanism, as in claim 6, in which the movable carriage consists of a shallow dished frame of fixed dimensions with a border seat and upturned wall edges to constitute a confining border rim;

and in which the cassette carrier seats in said carriage frame, the cassette carrier itself constituting a telescopic frame of two opposed interfitting parts, one of such parts being adjustably movable in the shallow dished carriage frame to any selected one of several predetermined positions to engage an oriented cassette of predetermined size, with means mounted on said movable part for resiliently and releasably latching said movable part in such selected position on the carriage frame to hold that one movable cassette part in such selected position;

and in which the second cassette frame part is slidably supported on said first one movable frame part, and embodies means for releasably latching the two parts;

whereby the cassette carrier frame may be adjustably telescoped or expanded to a predetermined dimension to hold a selected cassette, and the cassette carrier may be selectively positioned in one of a preselected group of positions in the carrier frame.

13. Spot film mechanism comprising a movable carriage frame of fixed dimensions;

an expansible and contractible frame to serve as a cassette carrier, said cassette frame having two movable telescoping parts nested in the carriage frame;

means secured to the first movable part of the cassette frame for holding that movable frame part against separation from the carriage frame while permitting relative movement of such movable cassette frame part in and on the carriage frame;

cooperating means on the carriage frame and on the said first part of the cassette frame for releasably latching said carriage frame and said cassette part, in one of several preselected adjusted positions;

and means on the second movable part of the cassette frame for releasably latching the two parts of the cassette frame in a selected one of several predetermined adjusted positions.

References Cited in the file of this patent

UNITED STATES PATENTS

| | | |
|---|---|---|
| 2,327,603 | Kizaur | Aug. 24, 1943 |
| 2,679,599 | Stuhlman | May 25, 1954 |
| 2,742,126 | Morton | Apr. 17, 1956 |
| 2,756,855 | Kloss | July 31, 1956 |
| 2,834,890 | Bastin et al. | May 13, 1958 |
| 2,883,545 | Guentner et al. | Apr. 21, 1959 |
| 2,921,202 | Berger et al. | Jan. 12, 1960 |